United States Patent [19]
Innes

[11] Patent Number: 5,777,835
[45] Date of Patent: Jul. 7, 1998

[54] THIRD PHASE RECONSTRUCTION FROM A TWO CURRENT TRANSFORMER SENSOR WITH THREE-PHASE TRUE RMS AND PHASE LOSS DETERMINATION CAPABILITIES

[75] Inventor: Mark E. Innes, Asheville, N.C.

[73] Assignee: Eaton Corporation, Cleveland, Ohio

[21] Appl. No.: 885,551

[22] Filed: Jun. 30, 1997

[51] Int. Cl.⁶ .................................................. H02H 3/00
[52] U.S. Cl. .............................. 361/93; 364/483; 361/76
[58] Field of Search .................... 361/93–97, 87, 361/31, 42, 44, 47–48, 76; 364/483, 487, 492

[56] References Cited

U.S. PATENT DOCUMENTS

| | | | |
|---|---|---|---|
| 2,202,998 | 6/1940 | Seeger et al. | 172/289 |
| 3,604,982 | 9/1971 | McDonald | 317/18 R |
| 3,614,533 | 10/1971 | Douglas et al. | 317/18 D |
| 3,875,464 | 4/1975 | Gary et al. | 317/13 R |
| 4,574,229 | 3/1986 | Kim | 318/788 |
| 4,683,513 | 7/1987 | Miller | 361/76 |
| 4,683,515 | 7/1987 | Beihoff et al. | 361/106 |
| 4,967,304 | 10/1990 | Dougherty | 361/31 |
| 5,113,304 | 5/1992 | Ozaki et al. | 361/87 |
| 5,220,478 | 6/1993 | Innes et al. | 361/93 |
| 5,239,438 | 8/1993 | Echtler | 361/44 |
| 5,450,268 | 9/1995 | Phillips et al. | 361/93 |
| 5,506,743 | 4/1996 | Phillips | 361/85 |
| 5,579,194 | 11/1996 | Mackenzie et al. | 361/24 |

Primary Examiner—Jeffrey A. Gaffin
Assistant Examiner—Michael J. Sherry
Attorney, Agent, or Firm—Whyte Hirschboeck Dudek S.C.

[57] ABSTRACT

A method and apparatus are disclosed to reconstruct a third phase for a three phase sensing system in which only two current transformers sense all three phases. Two phases of the three phase system are used as a single primary winding for each current transformer such that each current transformer produces a voltage representation of a sum of two phase currents. The present invention is directed toward reconstructing the third phase from the two discrete signals produced so that true RMS characteristics can be determined, as well as indicating any phase loss. Since all three phases can then be represented, this technique offers precise phase imbalance protection as well.

24 Claims, 5 Drawing Sheets

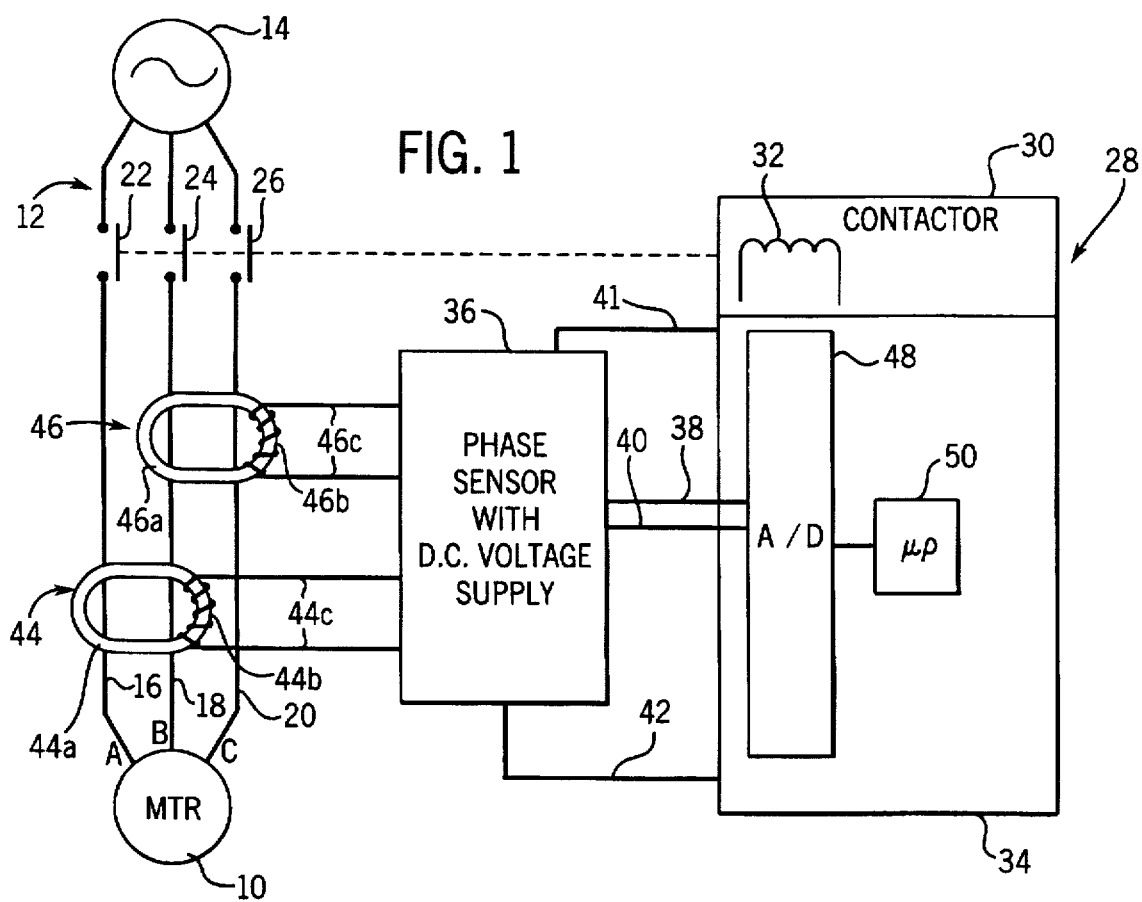
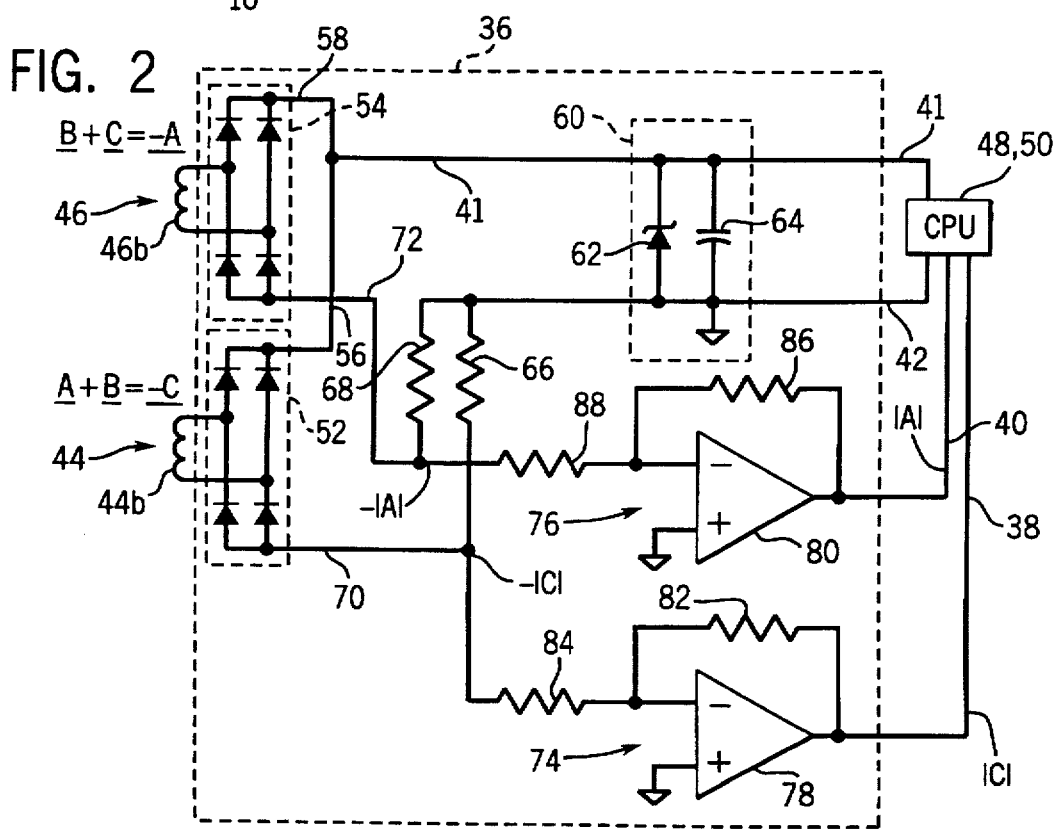

THIRD PHASE RECONSTRUCTION FROM A TWO CURRENT TRANSFORMER SENSOR WITH THREE-PHASE TRUE RMS AND PHASE LOSS DETERMINATION CAPABILITIES

CROSS-REFERENCE TO RELATED APPLICATIONS

The material presented herein is related to the material presented in the copending application Ser. No. 831,621, filed Apr. 9, 1997 entitled "Method and apparatus for three-phase sensing using two current transformers.

BACKGROUND OF THE INVENTION

The present invention relates generally to phase sensing of alternating currents in a polyphase distribution system, and more particularly, to a method and apparatus for three phase sensing using only two current transformers and reconstructing the third phase for phase loss monitoring and true RMS determination capabilities.

Current transformers (CTs) are commonly used for sensing AC electrical currents in load controls and in protection devices. For example, CTs are used in sensing electrical currents through contactors, motor starters and controllers, circuit breakers, monitors and analyzers, and in general, electrical distribution systems. In many such applications, these systems are polyphase, or more particularly three-phase, and generally require a CT for each phase.

Most modern prior art attempts at monitoring overload and fault conditions in a load supplied by a multi-phase, or polyphase power supply, use a current transformer in each phase of a three-phase power distribution system. For example, U.S. Pat. No. 4,967,304 discloses a digital circuit interrupter applicable for use on a three-phase power distribution system wherein a separate current transformer is required for each phase of the three-phase distribution system. One attempt at using two current transformers to detect phase failure and overload is disclosed in U.S. Pat. No. 2,202,998. However, the two CTs monitor only two of the three phases, and the third phase is only indirectly monitored. That is, a failure or overload on the unmonitored third phase is detected by the reaction it may have on the two monitored phases. The third phase itself is not monitored. A phase loss in the unmonitored phase will go undetected until the two CTs detect higher currents in the two monitored phases, which may be too late to protect modern loads having very tight thermal tolerances.

In monitoring the secondary windings of the CTs, the prior art has commonly used a single burden resistor for combining and averaging a representation value for the currents in each phase. In such systems, it is not possible to determine the true RMS value for each current in each phase. By combining the currents in a lump sum in a single burden, it is not possible to determine the out of balance contribution of an individual phase. The result is that in an unbalanced system, the phase drawing the most current, and therefore the hottest, is not properly protected. Therefore, in such systems it is necessary to monitor some other condition, such as voltage ripple on burden which adds complexity and expense to such systems, but only provides a mere approximation of the significant difference in phase currents.

One attempt at approximating an RMS current for each phase is disclosed in U.S. Pat. No. 5,450,268 wherein it is said to approximate the true RMS value within plus or minus 5%. This system approximates the RMS line current by determining a peak value of the current and combining it with a determined average value of the current in each phase. However, in this system since the negative side of each rectifier is connected to ground and the burden is taken with reference to the positive side of the rectifier, it is unable to provide a DC voltage supply to self-power the circuit. Further, this system does not provide a signal capable of providing the true RMS, but merely an approximation of the true RMS signal according to empirical data.

It would be desirable to have a method and apparatus using fewer CTs, but still monitor all three phases and reconstruct the third waveform to be capable of phase loss monitoring and true RMS determination to solve the aforementioned problems.

SUMMARY OF THE INVENTION

The present invention accomplishes the foregoing by providing a method and apparatus for reconstructing a third phase waveform from a summation of the three phases sensed by a two CT configuration. This system reduces the costs associated with the current transformers by ⅓ from that of most commercially available overload devices using 3 such CTs. A discrete signal is provided that is representative of the true RMS value for each current in the polyphase distribution system.

The present invention is applied in system in which a three phase sensor having separate burdens for each current transformer provides discrete signals from which the true RMS current can be determined, while at the same time provides a self-powering feature which does not detract from the capabilities of determining the true RMS values. A cost effective two CT configuration is used in which each CT is coupled to two phases of the three phase system. One CT senses the phase currents in phases A and B and provides a phase representation −C, and another CT senses currents in phases B and C and provides a phase representation −A. The present invention includes a way to reconstruct phase B using these phase representations. In this manner, a true RMS signal value for each phase can readily be determined and phase loss consistently monitored.

In accordance with one aspect of the invention, a method of reconstructing the third waveform is disclosed for use with a two CT configuration monitoring all three phases of a three phase distribution system. The method includes producing first and second rectified signals from each current transformer, wherein each rectified signal represents two phases of the three phase distribution system. The process includes assigning a different polarity sign to each half-wave of the first rectified signal, and assigning an opposite polarity sign to each of the half-waves of the second rectified signal, as compared with the first rectified signal. Next, periodic samples of the first and second rectified signals are taken to determine the signal magnitude and for detecting a transition in each of the rectified signals from one polarity sign to another. The polarity of the respective phase representation is changed according to the transition detection and the third phase is then reconstructed by integrating a series of determined magnitudes and polarities.

The present invention includes a device for monitoring a polyphase distribution system having two current transformers in operable association with each phase of the polyphase distribution system. The device provides a respective discrete signal for each phase. The device further includes a microprocessor programmed to reconstruct each phase from the respective discrete signals according to the aforementioned method.

The resulting phase reconstruction can be used in any conventional monitoring device to monitor all three phases in the polyphase distribution system. The device may produce a trip signal on a phase loss, or when any one of the signals are not within a predefined range. For example, if applied to an overload protection device, a phase loss or other irregularity can produce a trip signal to open a set of contacts in the polyphase distribution system for interrupting current flow therethrough and true RMS values can be calculated by known routines. The present invention is equally applicable to such monitoring devices as meters and other measuring or monitoring apparatus. Because the present invention monitors all three phases with only two CTs, substantial cost savings are also realized.

Various other features, objects and advantages of the present invention will be made apparent from the following detailed description and the drawings.

BRIEF DESCRIPTION OF THE DRAWINGS

The drawings illustrate the best mode presently contemplated for carrying out the invention.

In the drawings:

FIG. 1 is a schematic diagram of a motor starter incorporating the present invention.

FIG. 2 is a circuit schematic of a portion of FIG. 1.

DETAILED DESCRIPTION OF THE INVENTION

Figure 3:
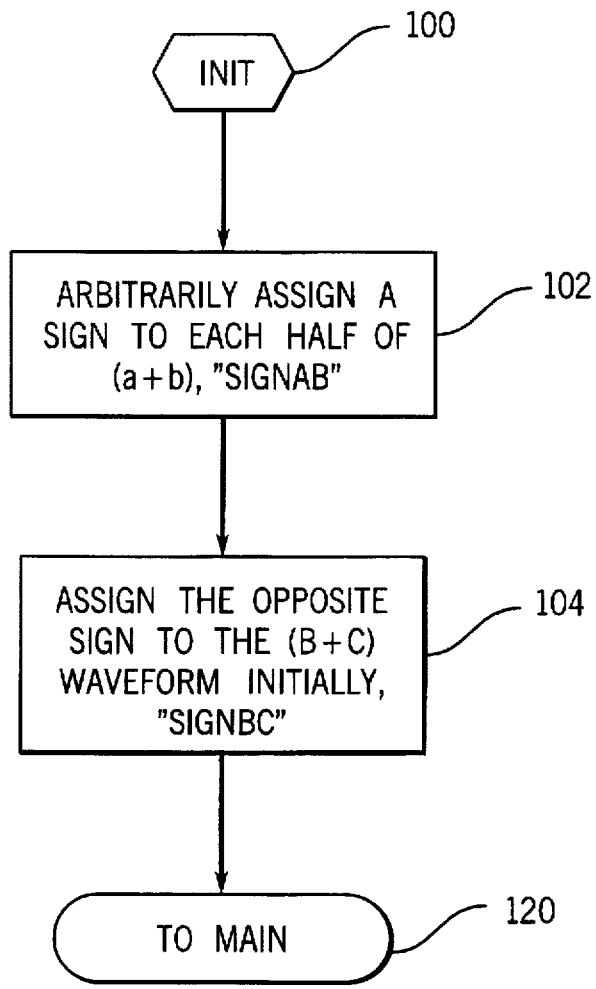
FIG. 3 is a flow chart in accordance with an initialization portion of the present invention.

The present invention is described herein in connection with a motor, a motor starter, and a thermal overload relay. However, it must be understood that the application of the invention in this configuration is for illustration only, and it will be appreciated by those skilled in the art that the present invention is equally applicable to any polyphase distribution system.

Referring to FIG. 1, an electric motor 10 is energized by a polyphase AC distribution system 12 connected to a power source 14. The polyphase AC distribution system 12 has three-phase conductors 16, 18, and 20 interruptible by a switch having contacts 22, 24, and 26 connecting the power source 14 to the motor 10 through the three-phase conductors 16, 18, and 20.

A motor starter 28 includes a contactor 30 incorporating a coil 32 which when energized, closes the switching contacts 22, 24, and 26 in conductors 16, 18, and 20 to connect the motor 10 to the power source 14. The motor starter 28 also has an overload relay 34 to receive analog signals representative of phase currents and to energize the contactor 30.

A phase sensor with DC voltage supply 36 is connected to two current transformers 44 and 46, each in operable association with two legs of the polyphase AC distribution system 12. Each of the current transformers 44, 46 include a toroidal core 44a, 46a and a secondary winding 44b, 46b, respectively. The conductors 16, 18, and 20 pass through the toroids 44a, 46a to form the primary winding of the current transformer. Conductors 16 and 18 pass through toroid 44a to form the primary winding of current transformer 44, and conductors 18 and 20 pass through toroid 46a to form the primary winding of current transformer 46. The secondary winding 44b generates analog signals representative of the currents in the associated conductors 16 and 18, and the secondary winding 46b generates analog signals representative of the currents in the associated conductors 18 and 20. The analog signals are relayed to the phase sensor 36 via leads 44c and 46c, respectively.

In this manner, each current transformer 44 and 46 monitors two phases in the polyphase system 12 to produce a signal representation of a sum of the two phases monitored. For example, current transformer 44 monitors phases A and B on conductors 16 and 18 and produces a representation of phase −C as a result of the vector addition in the current transformer on leads 44c to phase sensor 36. Similarly, current transformer 46 monitors phases B and C on conductors 18 and 20 to produce a signal representation of phase −A from the vector summation of B and C in current transformer 46, and supplies that result on leads 46c to the phase sensor 36.

In this two CT configuration, the phase sensor 36 can then supply two discrete signal representations in analog form on lines 38 and 40 to analog-to-digital (A/D) convertor 48 in overload relay 34 to digitize the signal representations. As will be described in more detail with reference to FIG. 2, the phase sensor 36 also supplies DC voltage on line 41 to the motor starter 28 to supply the A/D convertor 48 and microprocessor 50 with DC voltage. Line 42 provides a path for a common circuit ground.

The signals on lines 38 and 40 are representative of the RMS values in each of the phases as will be further described herein. As such, the true RMS values can be extracted through a number of known methods in microprocessor 50. One such method is disclosed in U.S. Pat. No. 5,220,478 which is owned by the assignee of the present invention, and is incorporated herein by reference.

A control or microprocessor 50 can obtain the true RMS value of the current signals and monitor the associated values of each digitized signal, and when a given value exceeds some predetermined value, or the magnitudes differ by more than a predefined value, the microprocessor control 50 can produce a trip signal to contactor 30 of motor starter 28 to open contacts 22, 24, and 26, thereby disconnecting motor 10 from power source 14. In a thermal overload application, the RMS values for the currents are integrated to create a total heat accumulation value. After subtracting a cooling factor, a net heat accumulated value is produced which can then be compared to a set point. A trip signal is produced when the net heat exceeds the set point. It is understood that the A/D converter 48 and microprocessor 50 can be equivalently replaced with a microcontroller.

Referring to FIG. 2, a circuit schematic for the two CT configuration is shown in which current transformers 44 and 46, having primary windings 44b and 46b, are connected to the phase sensor 36 to provide a DC voltage on line 41, a circuit common on line 42, and respective discrete signals representative of phase currents on lines 38 and 40. As previously described, the device for monitoring a polyphase distribution system has two current transformers 44 and 46 in operable association with each phase of the polyphase distribution system. The phase sensor 36 has two rectifiers 52 and 54, each in a typical four diode, full-wave rectifier configuration. The positive supply sides 56 and 58 of the rectifiers 52 and 54 are connected in common to a voltage regulator 60 on line 41. The voltage regulator 60 comprises a Zener diode 62, for regulating the DC power supply voltage, and a capacitor 64 to remove ripples and maintain a steady DC supply voltage. A CPU, including an A/D convertor 48 and a microprocessor 50, may be connected in common on the return path 42 with voltage regulator 60 through a pair of burden resistors 66 and 68 which are connected in a return path 70 and 72 of the rectifiers 52 and 54. A pair invertors 74 and 76 are connected to the return paths 70 and 72, respectively, to invert the discrete signals representative of the phase currents in order to provide positive respective discrete signals on lines 38 and 40 to the CPU. Each invertor 74 and 76 include a pair of Norton amplifiers 78 and 80, which do not require a negative power supply, and a set of gain controlling resistors 82, 84 and 86, 88, respectively.

In a preferred embodiment, the gain of the invertors is set to provide a maximum voltage signal on lines 38 and 40 approximately equal to, or slightly less than, the DC supply voltage to fully utilize the capabilities of the A/D converter. In the present embodiment in which the voltage regulator regulates a 5.0 volt DC power supply, the gain resistors, along with burden resistors 66 and 68 and the number of windings 44b and 46b of the transformers 44 and 46, define the voltage level of signals 38 and 40 to preferably peak at close to 5.0 volts, but no more than 5.0 volts. Those skilled in the art will readily recognize that for a 3.3 volt microprocessor, the values of the gain resistors and the burden resistors will change according to the number of windings in the transformers, as well other characteristics of the transformers.

As shown in FIG. 1, current transformer 44 senses the current on phases A and B and current transformer 46 senses the current on phases B and C. As such, through vector addition in the transformers, the signals on return paths 70 and 72 are a combination of the currents through the respective transformers. For example, where transformer 44 senses phases A and B, return path 70 provides a voltage equivalent to a negative absolute value of phase C. The current transformer 46 senses the currents in phases B and C to provide a voltage value on return path 72 representative of the negative absolute value of the current in phase A. With a gain of negative unity in each inverter 74 and 76, the values on lines 38 and 40 are therefore a positive representation of the phase currents. This arrangement provides signals on lines 38 and 40 to the CPU that are capable of providing true RMS current values for each phase of the polyphase distribution system.

The foregoing conclusion is based on the fact that under Kirchhoff's current law, the algebraic sum of the currents entering any node is zero. In other words, all current leaving the supply side of the rectifier must be equal to and return in the return path for that rectifier. For example, all current leaving rectifier 54 on supply side 58, must be equal in value, and return on return path 72 to the negative side of rectifier 54. Since the present invention splits the burden with respect to signals measured so that all the current from a particular current transformer returns individually to that current transformer, the RMS current of each individual phase can be accurately determined. The present invention accomplishes the foregoing, while also providing a DC voltage to form a self-powered circuit.

Referring to FIGS. 3-9, a method of reconstructing the third phase representation of a three phase distribution system is disclosed in which two current transformers are an operable association with each phase of the three phase distribution system as shown and described as reference to FIGS. 1 and 2. The method described and set forth with reference to FIGS. 3-9 is implemented with software as programmed into the microprocessor 50. For consistency, the exemplary nomenclature set forth above will continue to be followed wherein the third phase to be reconstructed will be represented by B.

Figure 4:
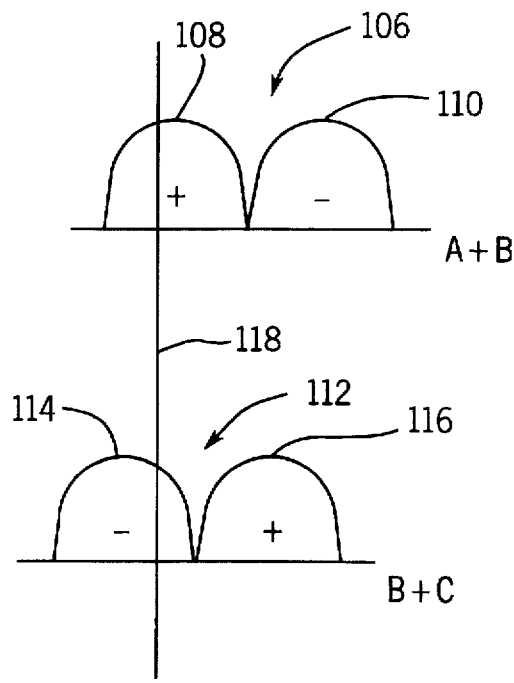
FIG. 4 shows a time line of two waveforms demonstrating the initialization portion shown in the flow chart of FIG. 3.

Referring to FIG. 3, the initialization procedure 100 first includes arbitrarily assigning at 102 a different polarity sign to each half-wave of the first rectified signal (A+B). The procedure next includes assigning an opposite polarity sign at 104 to each half-wave of the second rectified signal (B+C). As best shown in FIG. 4, the first rectified signal (A+B) 106 has a first half-wave 108 and a second half-wave 110. Since the first half-wave 108 has been arbitrarily assigned a positive polarity sign, the second half-wave 110 has been assigned a negative polarity. The second rectified signal (B+C) 112 has half-waves 114 and 116, each assigned opposite polarities and opposite of those in the first rectified signal 106. As indicated by time line 118, after the first half-wave 108 of the first rectified signal 106 is arbitrarily assigned a polarity sign, the first half-wave 114 of the second rectified signal 112 is assigned the opposite sign. Once the initialization procedure 100, FIG. 3 is complete, the procedure continues to the main section 120.

Figure 5:
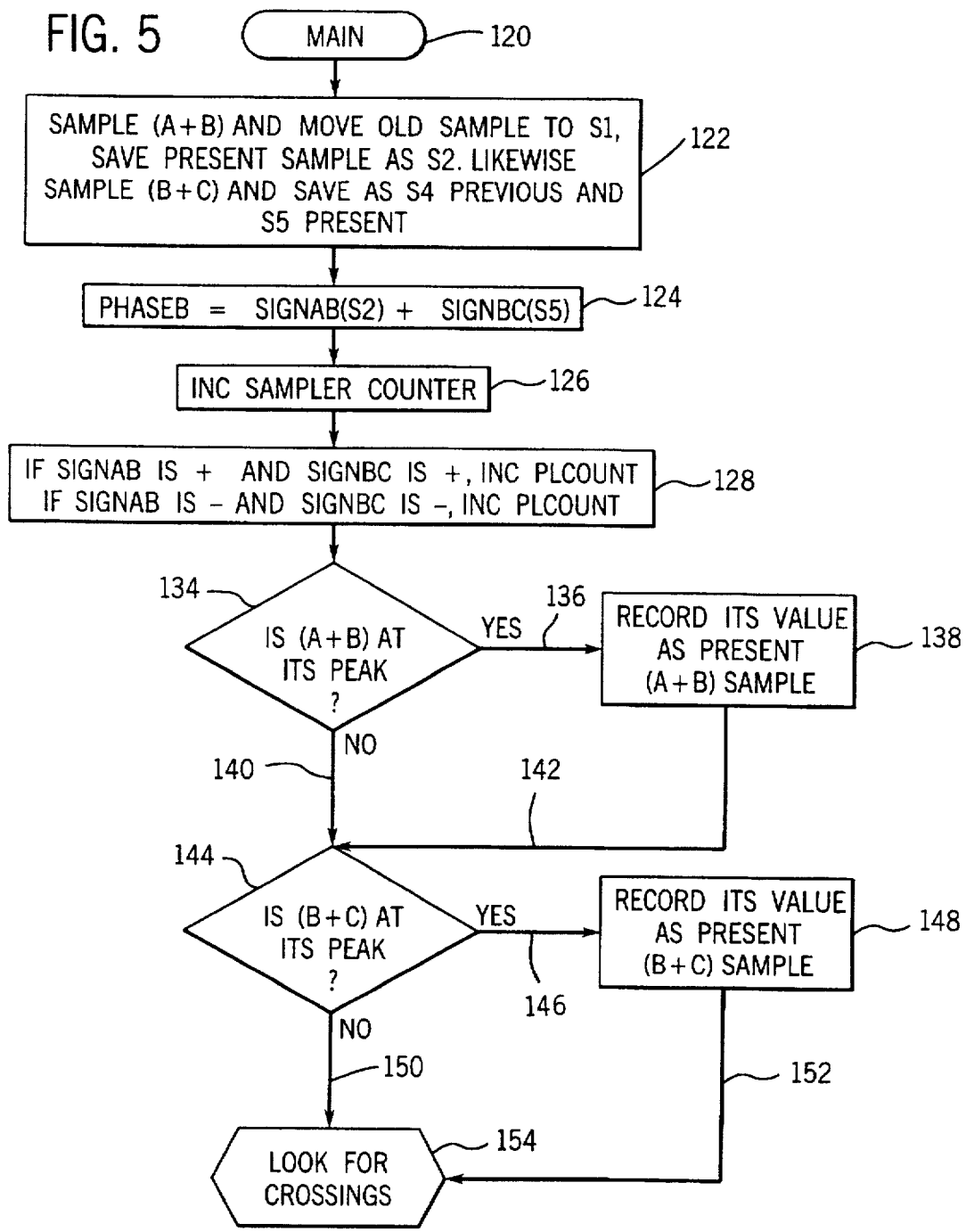
FIG. 5 is a flow chart showing a Main portion in continuation of the flow chart of FIG. 3.

In the main routine 120, the process includes detecting a transition in each of the rectified signals from one polarity sign to another occurring between the half cycles and determines a signal magnitude for the third phase B. Referring to FIG. 5, the main routine 120 begins with a sampling subroutine 122 in which the last sample of the first rectified signal (A+B) 106 is transferred to a data register S1, and the most current signal sample is saved in a data register S2. Similarly, when the second rectified signal (B+C) is sampled, the present signal sample is saved in data register S5 and the last signal sample is saved in data register S4.

The next subroutine under main 120 is a calculation to find the magnitude of the third phase representation 124. The magnitude of phase B is calculated by multiplying the polarity sign (plus or minus one) of the first rectified signal, by the sampled magnitude stored in register S2 of the first rectified signal and adding that result to a multiplication of the polarity sign of the second rectified signal by the sampled magnitude of the second rectified signal stored in register S5.

Next, in order to track the total number of samples taken, a variable sample_counter is incremented at 126. Another variable PLcount is incremented at 128 when the polarity signs of any concurrent sampling of the first and second rectified signals are equal. The use of sample_counter and PLcount will become apparent with reference to FIG. 9.

Figure 6:
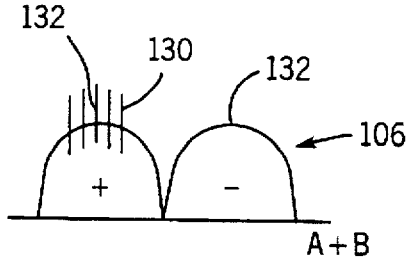
FIG. 6 shows a waveform in accordance with a sampling procedure according to the flow chart of FIG. 5.

Referring to FIG. 6, the first rectified signal (A+B) 106 depicts the signal sampling 130 which are used to determine the peak of each half-wave for the main routine 120. As indicated in the next step 134 of the FIG. 5 flow chart, each of these samples taken are compared to the last to determine whether the peak 132 has been reached. If the peak has been reached 136, the magnitude is stored as the present (A+B) sample at 138. If the first rectified signal (A+B) is not at its peak 140, or it was at its peak and has been recorded 142, the second rectified signal (B+C) is checked to see if the current sample is at a half-wave peak at 144. If it has 146, the peak value is recorded as the present magnitude of the second rectified signal (B+C) 148. If either the peak of the second rectified signal (B+C) has not reached its peak 150, or it has reached its peak and been recorded at 152, the main routine 120 proceeds to a subroutine 154 to find the transitions between half-waves.

Figure 7:
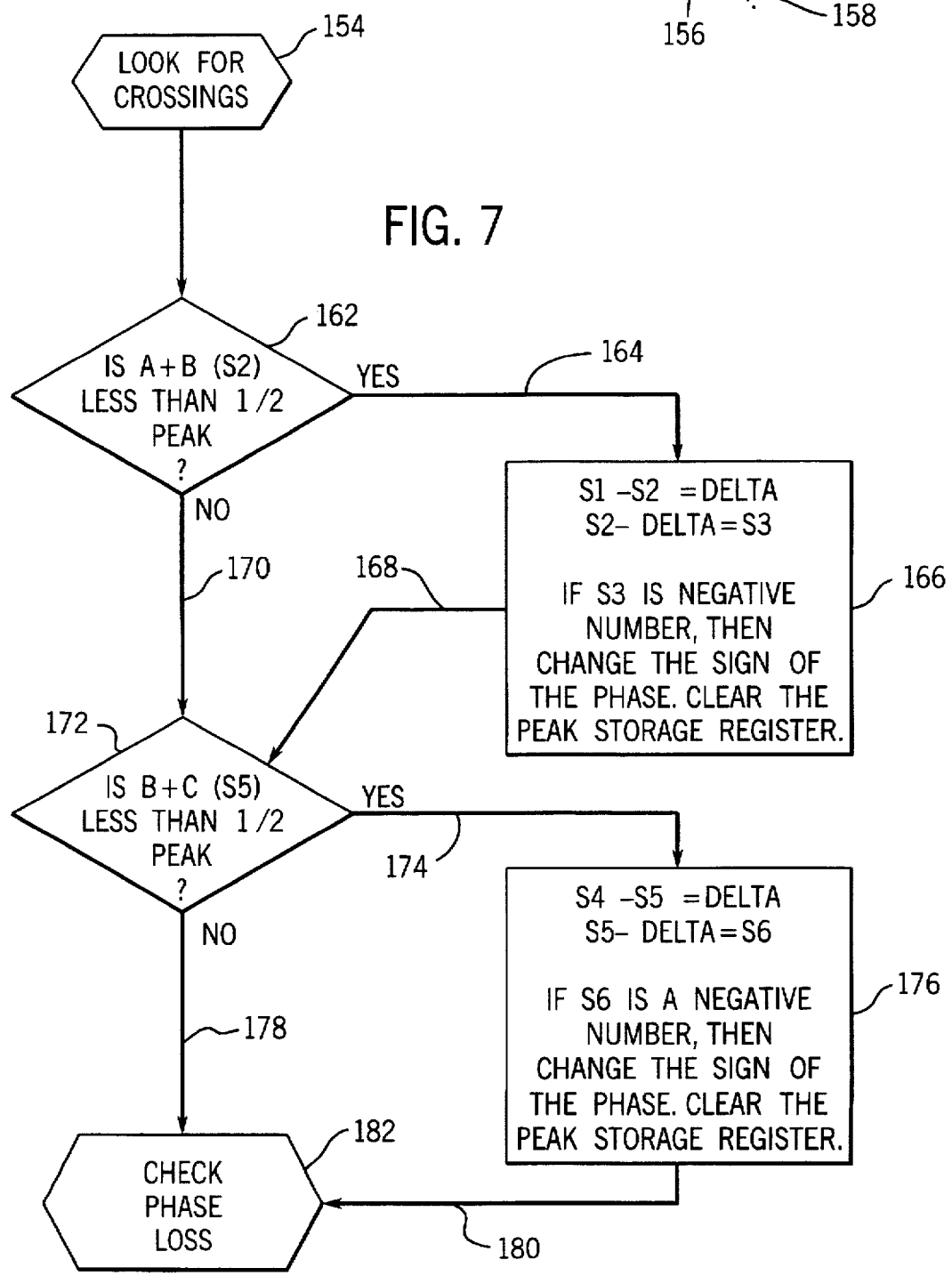
FIG. 7 is a flow chart showing a waveform transition determination portion in continuation of FIG. 5.

FIG. 7 shows the subroutine 154 for detecting transitions, or in other words, detecting crossings. In order to understand this flow chart, reference is first made to FIG. 8. After the half-wave peaks have been found in main 120, and recorded for every cycle, the equivalent zero-crossing 156, can be found. In other words, since the wave has been rectified, there is no actual zero-crossing, but the equivalent of a negative signal 158 can be found as a positive signal 160 to approximate the zero-crossing point 156 according to the routine depicted in FIGS. 7 and 8.

Figure 8:
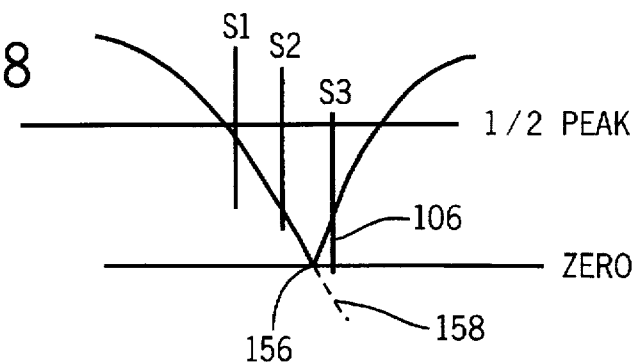
FIG. 8 shows waveform sampling and transition detection in accordance with the flow chart of FIGS. 5 and 7.

As shown in FIG. 8, since the sign wave is nearly linear for signals between ½ peak and zero, the zero-crossing 156 can be approximated in the subroutine 154 of FIG. 7. Since the peak value was previously recorded, the present sample can be compared to ½ the peak value for the first rectified signal 162, and if it is less that ½ peak, 164, then the slope of the curve is estimated by subtracting the present sample from the previous sample to approximate the change in the next sample at 166. A delta is determined from the S1 and S2 subtraction, and is then subtracted from the present sample S2 to predict the next sample S3. If the S3 sample is less than zero, then the waveform will change slope on the next sample and the polarity sign for that phase can be changed and the peak storage register cleared at 166. Afterward, 168, or if the first rectified signal is not less than ½ peak 170, the second rectified signal sample is checked to see if it is less than half the recorded peak at 172. If so, 174, a delta for the second rectified signal is determined by subtracting the present sample from the previous sample at 176. As previously described, the delta is then subtracted from the present sample and if it is less than zero, the sign of the phases is changed and the peak storage register is cleared at 176. If either the second rectified signal (B+C) has not reached half peak 178, or if it has reached half peak and the next sample is predicted at 176, the procedure continues along 180 to check for phase loss at subprocedure 182.

Figure 9:
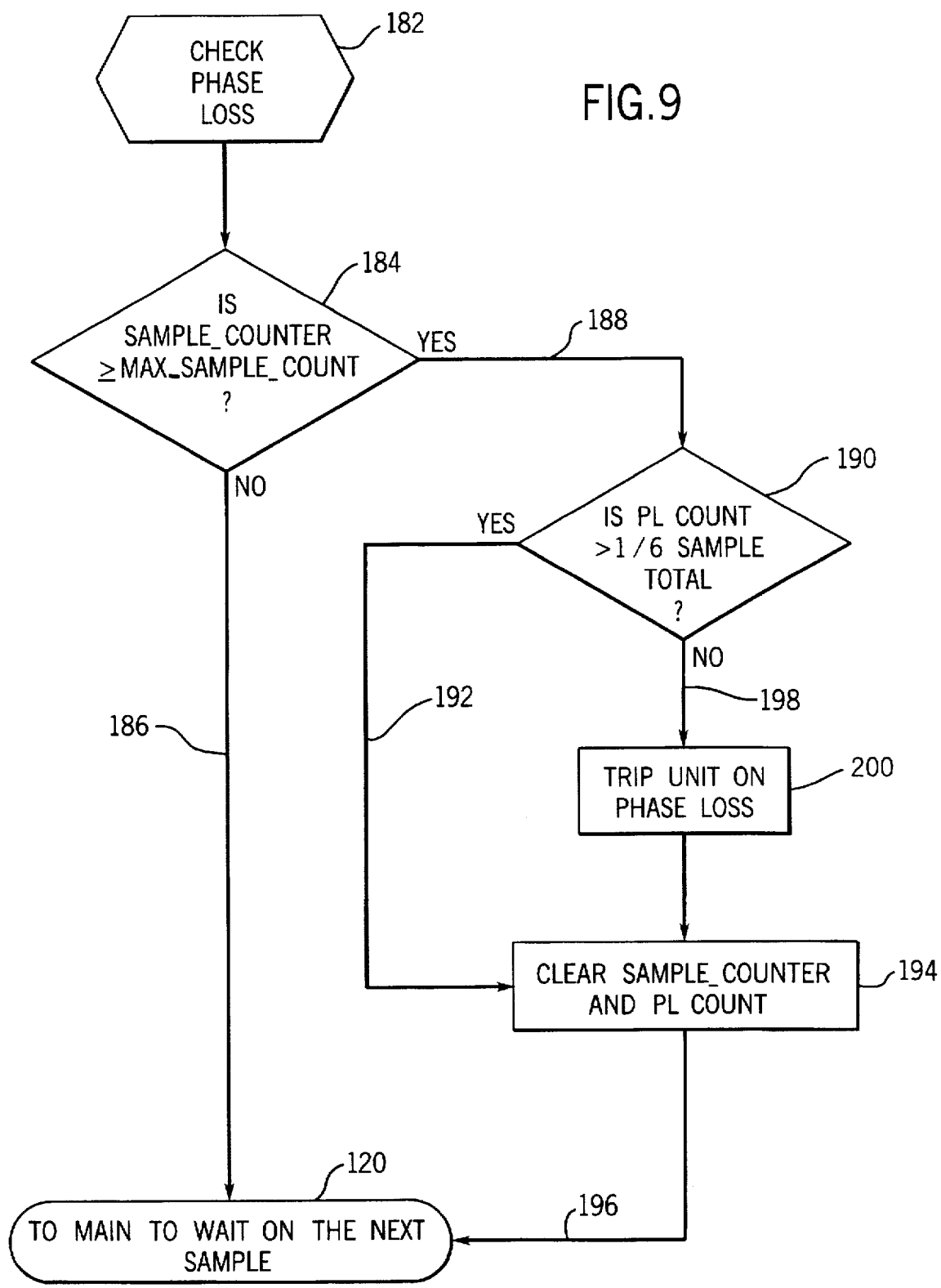
FIG. 9 is a flow chart showing a phase loss determination portion in continuation of FIG. 7.

As set forth in the flow chart of FIG. 9, the phase loss check 182 first determines whether the sample_count is greater or equal to a maximum sample count at 184 and if not, 186, the process returns to the main routine 120 to obtain the next set of samples. On the other hand, if the sample_count has reached the maximum_sample_count, 188, the PLcount variable register is checked to see if a sufficient number of equal polarity samples have been taken from the rectified signals at 190. If so, 192, the sample_count and PLcount variable registers are cleared and the system continues 196 to the main routine 120. However, if the comparison of the number of equal polarity samples is found to be equal to or less than a fraction of the sampling total 198, the system has indicated a phase loss 200. In the embodiment shown in FIGS. 1 and 2, the phase loss determination at 200 in FIG. 9, trips the contacts 22, 24, and 26 of FIG. 1 to interrupt power to the motor 10. Referring back to the flow chart of FIG. 9, the sample_count and the PLcount variable registers are then cleared at 194 and the system proceeds on 196 to the main routine 120.

Accordingly, the present invention not only includes the aforementioned method, it includes a microprocessor program according to the method to reconstruct the third phase from the respective discrete signals created by the two current transformer configuration shown in FIG. 1. In summary, the microprocessor 50 is programmed to assign a different polarity sign to each half-wave of the first rectified signal and assign an opposite polarity sign to each half-wave of the second rectified signal as compared to the first rectified signal, and as compared to each half-wave. The microprocessor is further programed to periodically sample the first and second rectified signals and detect a transition in each rectified signal from one polarity sign to another, and change the polarity of the respective phase representation upon transition detection. The microprocessor calculates the magnitude of the third phase representation from the aforementioned samples by multiplying the polarity sign of the first rectified signal by a sampled magnitude of the first rectified signal and adding the result to the product of the polarity sign of the second rectified signal and the sampled magnitude of the second rectified signal. The third phase is reconstructed by integrating a series of sampled third phase magnitudes to form a third phase representation. The reconstructed third phase has a polarity that is either correct or 180° shifted because of the initial arbitrary sign assignment. However, errors of 180° are transparent since the signals are rectified and have no adverse affect.

The microprocessor is programmed to detect a transition in each rectified signal by first locating a peak of each half-wave for each rectified signal, and tracking a curvature of each rectified signal after the peak detection to determine a near linear portion of the rectified signal. The present amplitude level from a rectified signal is subtracted from a previous amplitude level to determine an approximate linear slope, and that approximate linear slope is then subtracted from the present amplitude to predict a future amplitude level. The polarity sign of the respective phase representation is changed when the future amplitude level is less than zero.

The microprocessor is also programmed to detect a phase loss by monitoring a number of equal polarity samples taken from the rectified signals (i.e. where the polarity sign for each rectified signal is equal) and comparing the number of equal polarity samples against a fraction of a sampling total. A phase loss is indicated when the number of equal polarity samples is less than a fraction of the sample total.

The present invention has been thoroughly described herein as applied to a motor, a motor starter, and a thermal overload. However, it is understood that the invention is well suited for use in any polyphase distribution system and is not limited to the application described herein and shown in the drawings.

Further, the present invention has been described in terms of the preferred embodiment and it is recognized that equivalents, alternatives, and modifications, aside from those expressly stated, are possible and within the scope of the appending claims.

I claim:

1. A method of reconstructing a third phase representation in a three phase distribution system sensed with two current transformers in operable association with each phase of the three phase distribution system, comprising the steps of:

producing first and second rectified signals from each current transformer, each rectified signal representing two phases of the three phase distribution system and having two half-waves;

assigning a different polarity sign to each half-wave of the first rectified signal;

assigning an opposite polarity sign to each half-wave of the second rectified signal as that of the first rectified signal;

periodically sampling the first and second rectified signals;

detecting a transition in each rectified signal from one polarity sign to another; and changing polarity of the phase representation with transition detection.

2. The method of claim 1 further comprising the step of calculating the magnitude of the third phase representation.

3. The method of claim 2 wherein the step of calculating further comprises:

multiplying the polarity sign of the first rectified signal by a sampled magnitude of the first rectified signal for a first result;

multiplying the polarity sign of the second rectified signal by a sampled magnitude of the second rectified signal for a second result; and adding the first and second results to form a sampled third phase magnitude.

4. The method of claim 3 further comprising the step of integrating a series of sampled phase magnitudes to form the phase representation.

5. The method of claim 4 further comprising the step of combining the integrated series of sampled phase magnitudes for one polarity with another integrated series of sampled phase magnitudes of the opposite polarity as determined by the step of changing polarity with transition detection.

6. The method of claim 1 wherein the step of detecting a transition is further defined as:

locating a peak of each rectified signal;

tracking a curvature of each rectified signal after peak detection to determine an approximate linear portion of the rectified signal;

recording amplitude levels in the approximate linear portion;

subtracting a present amplitude level from a previous amplitude level for a rectified signal to determine an approximate linear slope;

subtracting the approximate linear slope from the present amplitude level to determine a future amplitude level; and changing the polarity sign of the phase representation when the future amplitude level is less than or equal to zero.

7. The method of claim 1 further comprising the step of recording the peak of each rectified signal at least once per cycle.

8. The method of claim 6 further comprising the step of completing the steps in detecting a transition for the first rectified signal, then completing the steps in detecting a transition for the second rectified signal.

9. The method of claim 8 further comprising the step of integrating a series of sampled phase magnitudes to form the phase representation having a full wave sinusoid wave pattern.

10. The method of claim 1 further comprising the step of detecting a phase loss.

11. The method of claim 10 wherein the step of detecting a phase loss further comprises the steps of:

monitoring a number of equal polarity samples taken from the rectified signal where the polarity sign for each rectified signal is equal;

comparing the number of equal polarity samples against a fraction of a sampling total; and indicating a phase loss when the number of equal polarity samples is less than the sampling total fraction.

12. The method of claim 11 wherein the fraction is one-sixth of the sampling total.

13. A method of reconstructing a third phase representation of a three phase distribution system sensed with two current transformers in operable association with each phase of the three phase distribution system, comprising the steps of:

producing first and second rectified signals from each current transformer, each rectified signal representing two phases of the three phase distribution system and having two half-waves;

assigning a different polarity sign to each half-wave of the first rectified signal;

assigning an opposite polarity sign to each half-wave of the second rectified signal as that of the first rectified signal;

periodically sampling the first and second rectified signals; and calculating the magnitude of the third phase representation by:

multiplying the polarity sign of the first rectified signal by a sampled magnitude of the first rectified signal for a first result;

multiplying the polarity sign of the second rectified signal by a sampled magnitude of the second rectified signal for a second result; and adding the first and second results to form a sampled third phase magnitude.

14. The method of claim 13 further comprising the step of integrating a series of sampled phase magnitudes to form the phase representation.

15. The method of claim 13 further comprising the step of detecting a phase loss by:

monitoring a number of equal polarity samples taken from the rectified signal where the polarity sign for each rectified signal is equal;

comparing the number of equal polarity samples against a fraction of a sampling total; and indicating a phase loss when the number of equal polarity samples is less than the sampling total fraction.

16. A device for monitoring a polyphase distribution system comprising:

two current transformers in operable association with each phase of a polyphase distribution system;

two rectifiers, each rectifier connected to a current transformer;

two burdens, each burden connected in a return path of each rectifier and providing respective discrete signals representative of phase current; and a microprocessor programmed to reconstruct each phase from the respective discrete signals.

17. The device of claim 16 wherein the device produces first and second rectified signals from each current transformer, each rectified signal representing two phases of the three phase distribution system and having two half-waves, and the microprocessor is further programmed to:

assign a different polarity sign to each half-wave of the first rectified signal;

assign an opposite polarity sign to each half-wave of the second rectified signal as that of the first rectified signal;

periodically sample the first and second rectified signals;

detect a transition in each rectified signal from one polarity sign to another; and change polarity of the phase representation with transition detection.

18. The device of claim 17 wherein the microprocessor is further programmed to calculate the magnitude of the phase representation by:

multiplying the polarity sign of the first rectified signal by a sampled magnitude of the first rectified signal for a first result;

multiplying the polarity sign of the second rectified signal by a sampled magnitude of the second rectified signal for a second result; and adding the first and second results to form a sampled third phase magnitude.

19. The device of claim 18 wherein the microprocessor is further programmed to:

integrate a series of sampled phase magnitudes to form the phase representation; and combine the integrated series of sampled phase magnitudes for one polarity with another integrated series of sampled phase magnitudes of the opposite polarity as determined by the change in the polarity with transition detection.

20. The device of claim 16 wherein the microprocessor is further programmed to:

locate a peak of each rectified signal;

track a curvature of each rectified signal after peak detection to determine a near linear portion of the rectified signal;

record amplitude levels in the near linear portion;

subtract a present amplitude level from a previous amplitude level to determine a linear slope constant;

subtract the linear slope constant from the present amplitude to determine a future amplitude level; and change the polarity sign of the third phase representation when the future amplitude level is less than zero.

21. The device of claim 16 wherein the microprocessor is further programmed to detect a phase loss.

22. The device of claim 21 wherein the microprocessor is programmed to detect the phase loss by:

monitoring a number of equal polarity samples taken from the rectified signal where the polarity sign for each rectified signal is equal;

comparing the number of equal polarity samples against a fraction of a sampling total; and indicating a phase loss when the number of equal polarity samples is less than the sampling total fraction.

23. The device of claim 16 further comprising means for supplying a D.C. power supply to the microprocessor thereby providing a self-powering feature.

24. The device of claim 16 further comprising a voltage regulator connected to at least one rectifier and capable of supplying a positive D.C. power supply to the microprocessor.

* * * * *

UNITED STATES PATENT AND TRADEMARK OFFICE
CERTIFICATE OF CORRECTION

PATENT NO. : 5,777,835
DATED : July 7, 1998
INVENTOR(S) : Innes, Mark E.

It is certified that error appears in the above-identified patent and that said Letters Patent is hereby corrected as shown below:

Column 5, line 14, after "pair", insert --of--; and

Column 8, line 20, delete "1800" and substitute therefor --180°--.

Signed and Sealed this

Eighth Day of September, 1998

Attest:

BRUCE LEHMAN

Attesting Officer

Commissioner of Patents and Trademarks